Patented June 4, 1935

2,003,684

UNITED STATES PATENT OFFICE 2,003,684

INCENSE

Emile Frantz, San Francisco, Calif.

No Drawing. Application January 27, 1934, Serial No. 708,697

8 Claims. (Cl. 167—94)

This invention relates to incense and fumigating pastilles generally and has for its objects an improved incense extremely easy and cheap to make and yielding an odor characteristic of the eucalyptus tree and carrying with it some of the well-known beneficial effects of eucalyptol on the respiratory tract. Another object of the invention is to provide such an incense in the form of a stick or pastille which will burn slowly and evenly yet emit little or no smoke.

The eucalyptus tree is native of Australia, but is also common in California, and it is common to note when in the vicinity of these trees the penetrating fragrance exuded by the leaves. This is especially noticeable from the leaves of eucalyptus shoots around the stumps of trees cut down, also very young trees, as the leaves are of a distinctly different shape than the elongated dark green scimitar-shaped leaves of the old trees, being in fact of broad oval shape and covered with a bluish-white frost-like layer of camphoraceous matter giving off at ordinary temperatures a strong odor characteristic of the oil of eucalyptus.

Knowing that the oil of eucalyptus is distilled from the leaves of this tree, I made many attempts to make an incense of the leaves by grinding them up, adding various binders and some combustibles to insure burning, but could not secure sufficient of the characteristic odor except from the young leaves which are difficult to obtain, and there was always excessive smoke characteristic of burning leaves, together with objectionable empyreumatic odors. After considerable experimenting with the leaves as well as with neutral punks impregnated with the oil of eucalyptus, without reaching satisfactory results, I observed the many seed pods and caps which lie about the ground under the trees, these pods being funnel-shaped and from a half inch to an inch in length and each provided with an almost hemispherical cap, generally from a half inch to an inch in diameter, which falls off of the pod when ripe and exposes a mass of filaments or petals which later also fall away and finally the pod itself falls to the ground.

These pods and their caps when dried are very hard woody affairs difficult to cut with a knife, but when freshly fallen they are about as pliable as leather except some of the larger pods which appear to take a somewhat different form on the same tree and show a rather hard woody center.

The exteriors of both pods and caps are rough and covered with the same bluish-white layer of camphoraceous matter as found on the young leaves, and further, upon dissecting the pods and caps I discovered a row of large cells filled with a gummy and oily substance smelling strongly of eucalyptus. I further found that if the pods and caps, while still fresh enough to be pliable, are simply run through a food chopper they may be easily reduced to a fine granular pasty form which may be molded into shape of pastilles, or simply pushed out of the nozzle of a common hand-operated grease gun to form sticks from an eighth of an inch to a quarter inch in diameter, and that after drying a few days the sticks are hard, strong, and durable, yet if lighted will smoulder like a punk and burn very slowly until entirely consumed, even though held in vertical position, without any extraneous additions of any kind. Moreover, these sticks or pastilles emit no objectionable smoke and yet give off an unusually strong and pleasant odor more characteristic of the camphoraceous matter on the young leaves mentioned and much more pleasant to the average sense of smell than the odor of oil of eucalyptus or of eucalyptol.

I further found that both the pods and caps are equally useful for my product, and that if the fallen pods and caps are too dry to yield a cohesive mass upon simple grinding, that they will do so if subject to simple boiling in little water for fifteen to thirty minutes until they soften, or if softened by steaming for about the same length of time. Some of the very fully developed or hard woody center pods will not soften and may be discarded.

There are several varieties of eucalyptus growing in California, principally the eucalyptus globulus ("blue gum"), the pods and caps of which are preferred.

Some of the advantages of incense sticks made by my invention are that they are very slow and long burning, or rather smouldering, compared to other incense, so that a small stick gives off its odor for a long time. Also, they give off very little thin transparent smoke; they are hard and durable so that they may be handled and packed without danger of breaking or disintegrating; and they do not deteriorate in aroma after long storage. Besides being of very agreeable odor, they are thought to be equal to vaporized oil of eucalyptus in the treatment of colds, yet much easier to use and cheaper to produce, and I believe that my discovery that the fallen buds and caps of the eucalyptus may be used to produce such an incense pastille or stick is of considerable value, and I therefore claim:

1. An incense consisting of a solid piece of slowly combustible material consisting of the ground pods of eucalyptus trees molded to form.

2. An incense consisting of a solid piece of slowly combustible material consisting of the ground caps of eucalyptus trees molded to form.

3. An incense consisting of a solid piece of slowly combustible material consisting of the ground pods and caps of eucalyptus trees molded to form.

4. The process of making incense consisting in grinding the relatively fresh and moist pods of the eucalyptus tree and forming the mass into sticks.

5. The process of making incense consisting in boiling to softness and grinding the fallen pods of the eucalyptus tree and forming the mass into sticks.

6. An incense containing as an essential ingredient thereof the ground pods and caps of eucalyptus trees.

7. An incense containing as an essential ingredient thereof the ground pods of eucalyptus trees.

8. An incense containing as an essential ingredient thereof the ground caps of eucalyptus trees.

EMILE FRANTZ.